W. L. MONROE.
FORAGE GRANULATING MACHINE.
APPLICATION FILED JULY 23, 1909.
1,061,920.
Patented May 13, 1913.
7 SHEETS—SHEET 1.
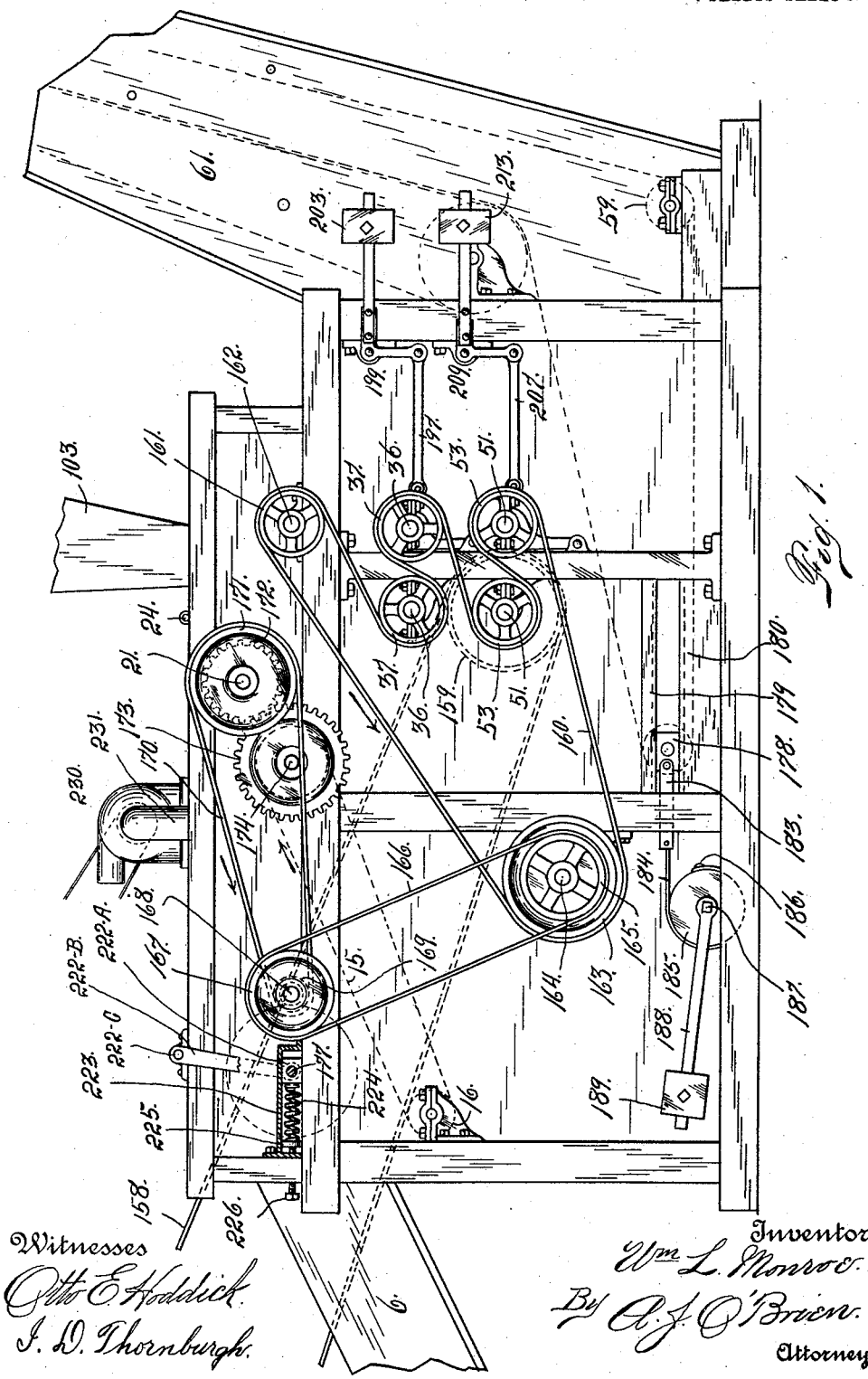
Witnesses
Otto E. Hoddick.
J. D. Thornburgh.
Inventor
Wm L. Monroe.
By A. J. O'Brien.
Attorney W. L. MONROE.
FORAGE GRANULATING MACHINE.
APPLICATION FILED JULY 23, 1909.
1,061,920.
Patented May 13, 1913.
7 SHEETS—SHEET 2.
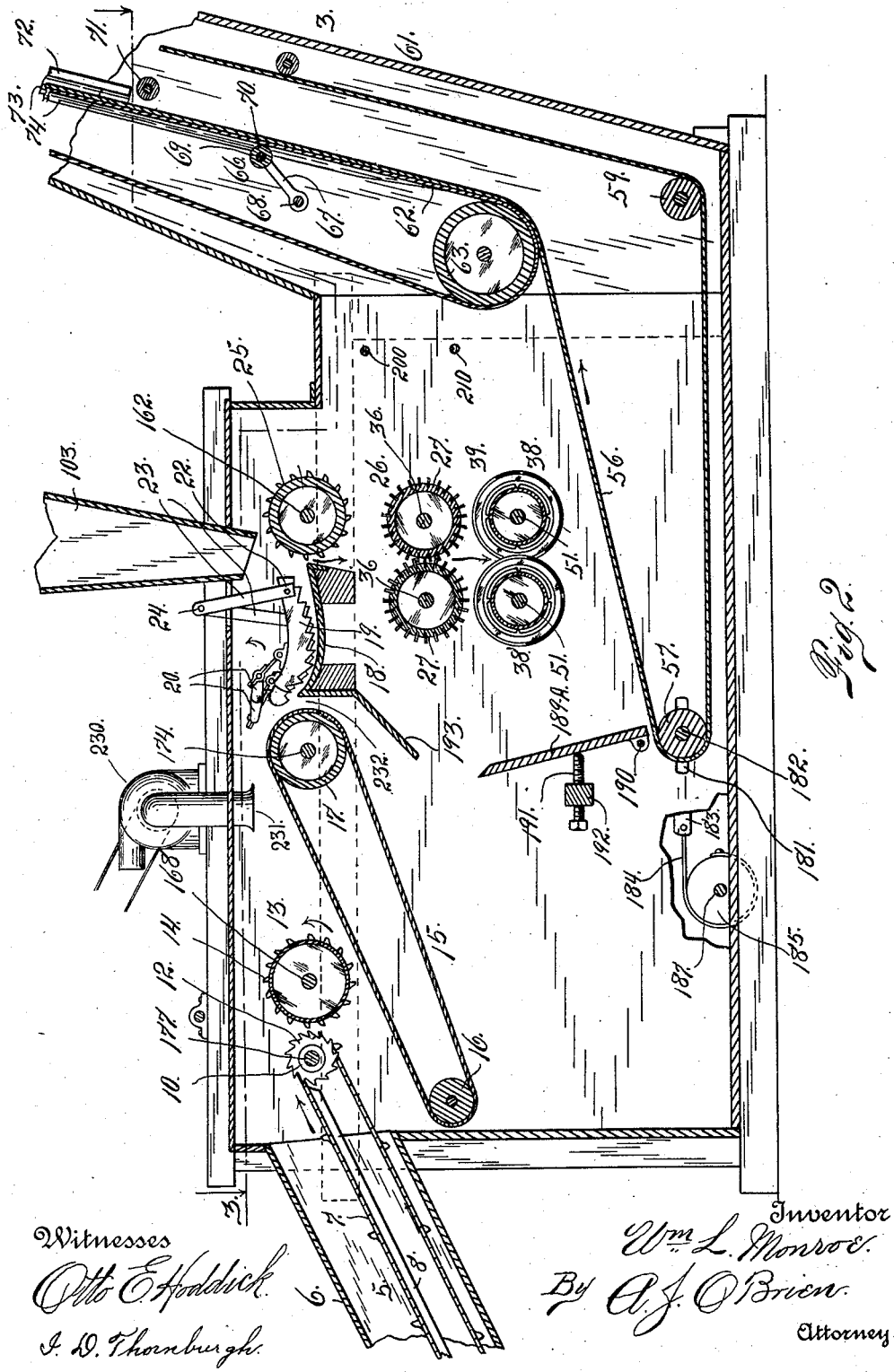
Witnesses
Otto E. Hoddick.
I. D. Thornburgh.
Inventor
Wm. L. Monroe.
By A. J. O'Brien.
Attorney W. L. MONROE.
FORAGE GRANULATING MACHINE.
APPLICATION FILED JULY 23, 1909.
1,061,920.
Patented May 13, 1913.
7 SHEETS—SHEET 3.
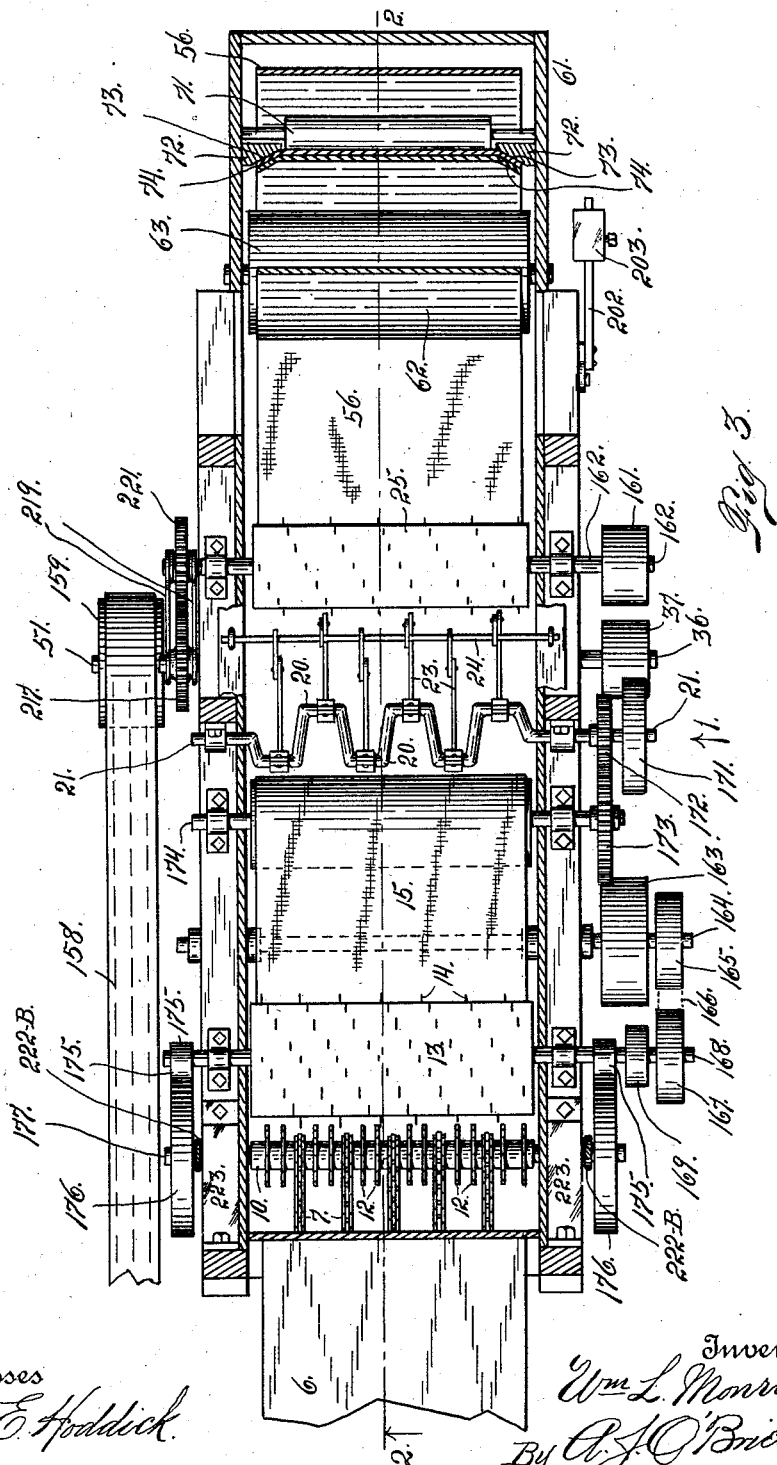

W. L. MONROE.
FORAGE GRANULATING MACHINE.
APPLICATION FILED JULY 23, 1909.
1,061,920.
Patented May 13, 1913.
7 SHEETS—SHEET 4.
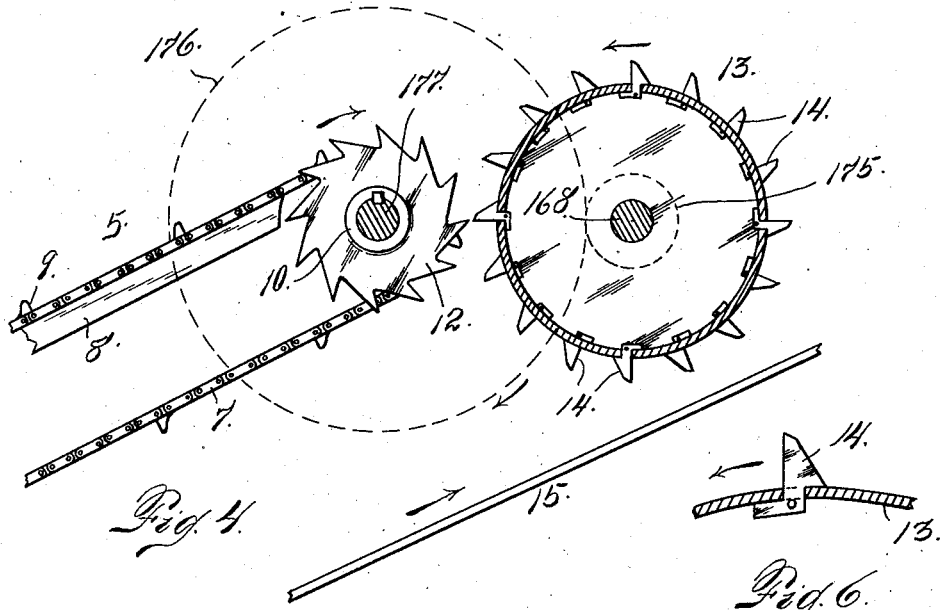
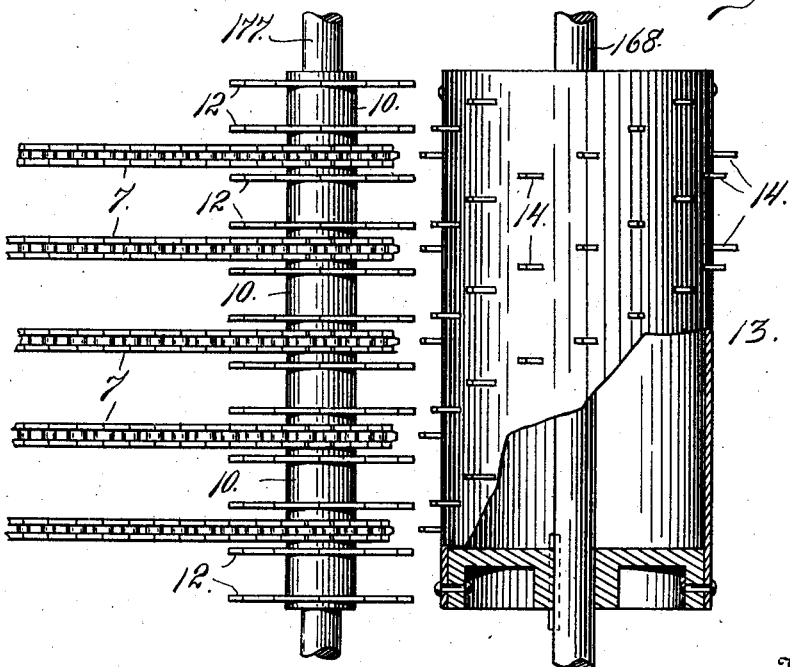

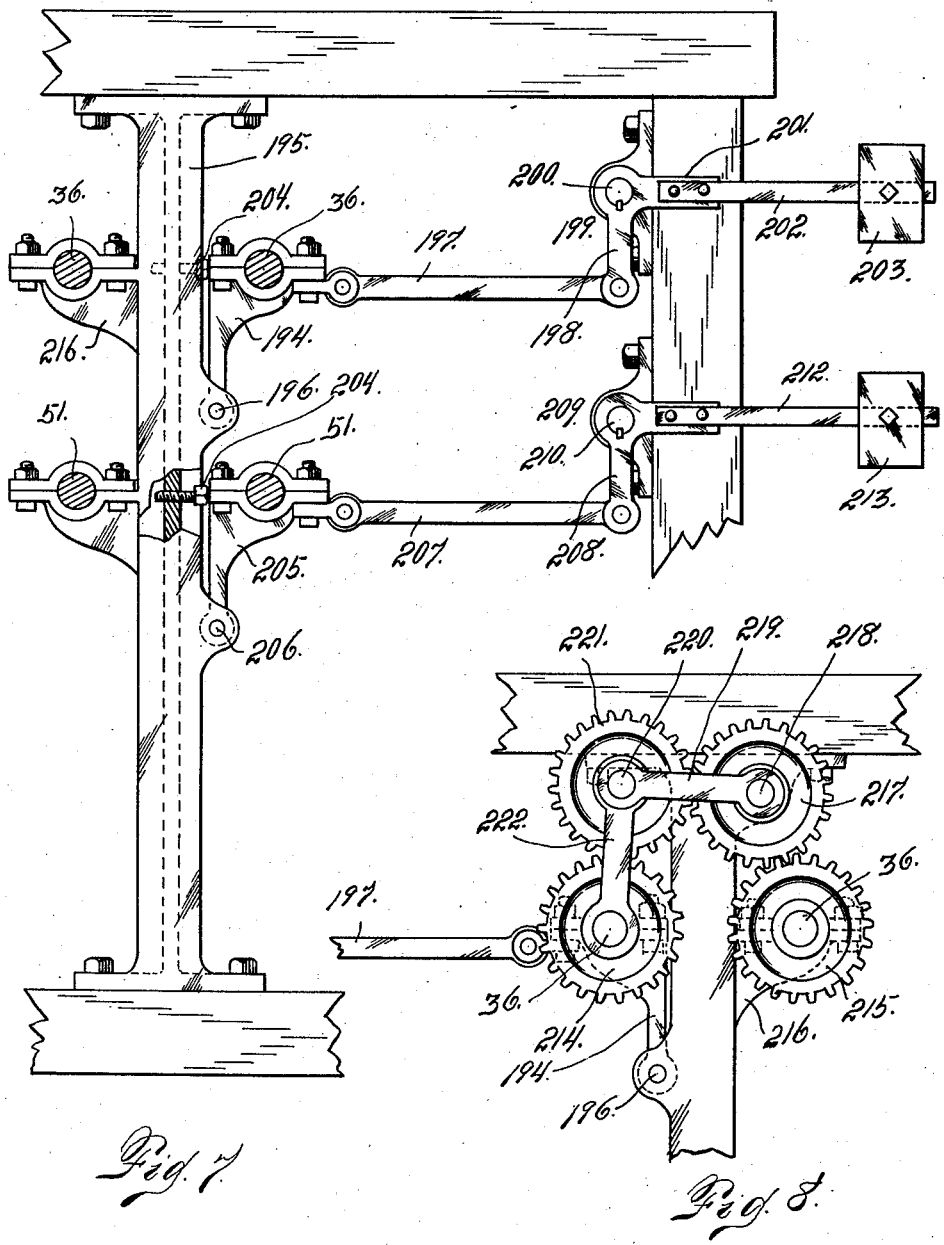

W. L. MONROE.
FORAGE GRANULATING MACHINE.
APPLICATION FILED JULY 23, 1909.
1,061,920.
Patented May 13, 1913.
7 SHEETS—SHEET 6.
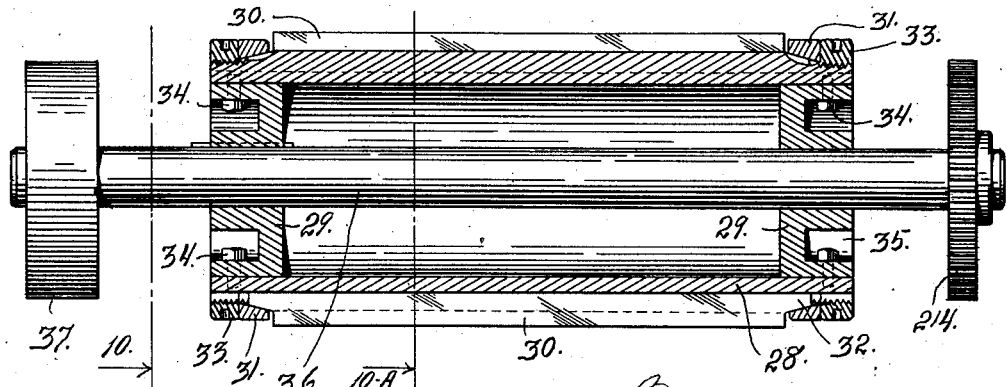
Fig. 9.
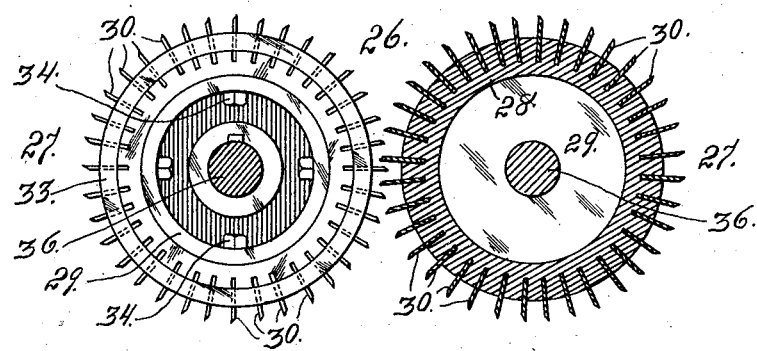
Fig. 10.
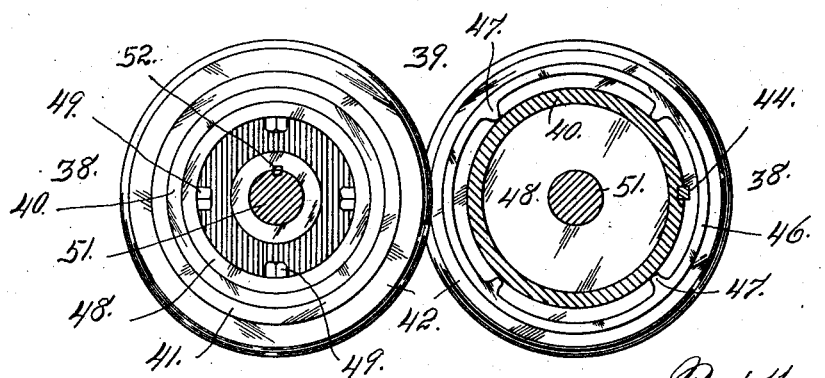
Fig. 11.
Fig. 12.
Witnesses
Otto E. Hoddick
I. D. Thornburgh
Inventor
Wm. L. Monroe
By A. J. O'Brien
Attorney W. L. MONROE.
FORAGE GRANULATING MACHINE.
APPLICATION FILED JULY 23, 1909.
1,061,920.
Patented May 13, 1913.
7 SHEETS—SHEET 7.
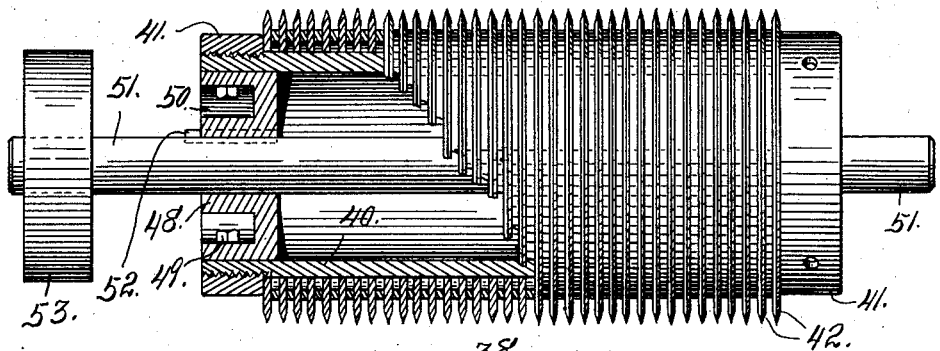
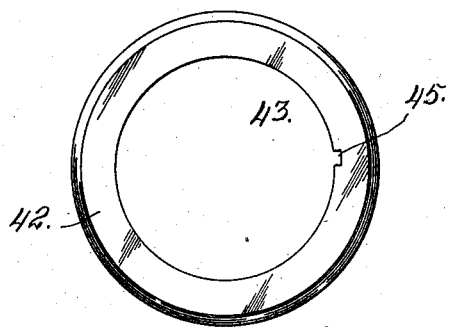
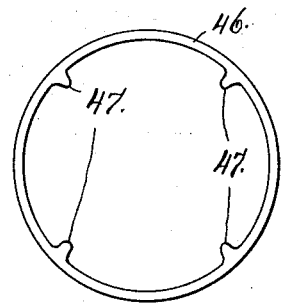
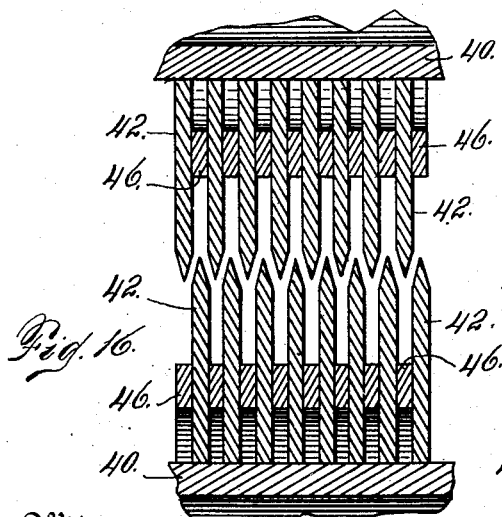
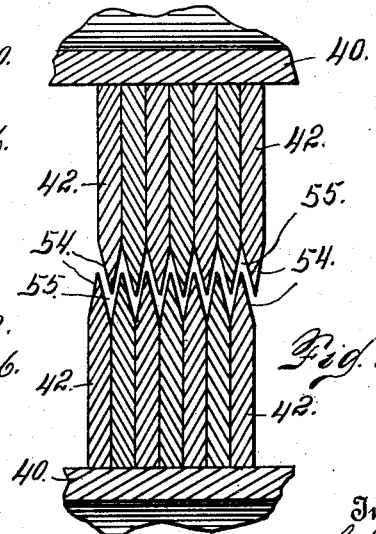
Witnesses
Otto E. Hoddick
J. D. Thornburgh
Inventor
Wm L. Monroe
By A. J. O'Brien
Attorney

UNITED STATES PATENT OFFICE.

WILLIAM L. MONROE, OF DENVER, COLORADO.

FORAGE-GRANULATING MACHINE.

1,061,920.  Specification of Letters Patent.  Patented May 13, 1913.

Application filed July 23, 1909. Serial No. 509,247.

*To all whom it may concern:*

Be it known that I, WILLIAM L. MONROE, citizen of the United States, residing at the city and county of Denver and State of Colorado, have invented certain new and useful Improvements in Forage-Granulating Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in forage granulating machines, the term forage in this sense meaning practically all kinds of fodder or feed for stock, and while the invention may be employed for granulating practically all classes of forage, it is more specifically intended for use in connection with alfalfa. This material is exceedingly difficult to treat by any of the processes or machines ordinarily employed for the purpose. In my improved construction, however, provision is made for both cutting and breaking the stalks of the material, the rolls employed being especially constructed with this end in view. These rolls are usually arranged in sets of four, four rolls forming a unit. The rolls are arranged in pairs, one pair above the other. The upper pair is usually equipped with longitudinally disposed knives, arranged around the surface of a cylindrical drum, the knives being disposed at suitable intervals, the knives of the one roll being arranged to intermesh or pass intermediately between the knives of the other roll. These rolls are also arranged in such relation to each other that the knives of either roll are prevented from coming in direct contact with the surface of the opposite roll. The pair of rolls below those just described, usually have knives circularly arranged thereon and also arranged to intermesh, that is to say each individual knife of one roll is arranged to pass between the adjacent two knives of the opposite roll. These circular-knife-carrying rolls are also so arranged that the edges of the knives of one roll are prevented from coming in direct contact with the peripheral face or surface of the opposite roll or in shearing contact with the knives of the opposite roll. The particular arrangement and disposition of the knives of each individual roll, in relation to the knives of its coöperating roll whereby the edge of each individual knife passes midway between and below the edges of the two knives coöperating with it on the opposite roll, giving them a combined cutting and breaking action on the material being treated is important. The impact of each individual knife, partly due to the speed at which the rolls rotate, is equivalent to a sudden blow, with the weight of the roll behind it, delivered midway between two points supporting the material being acted upon, the effect of such a blow being to sever the material with the minimum expenditure of force. The multiplicity of knives serves the purpose of holding the material in position while being acted upon by the coöperating rolls. While these rolls constitute the main portion of the machine, there are many other functions to be performed, and various mechanisms employed for treatment of the material, both before it reaches the rolls and after it has passed therethrough. Before reaching the rolls, the material is fed to what I will term a picking drum, being carried thereto by a conveyer, whose upper extremity is equipped with a toothed roller having a comparatively slow movement. The picking drum travels much faster, approximately ten times as fast as the roll at the top of the conveyer, the latter being in the nature of a retarding device, whereby the material in its original shape is retained until the picking drum has separated it, as is required before it can pass to the cutting rolls.

The material to be reduced, when fed to the machine is usually in bunches, and often is closely matted and stuck together due to its having been stored in stack or mow before it was sufficiently dry or having become wet after it was stored, and one very important function of the picking drum is to pick and tear the bunches and mats to pieces and thus properly prepare the material to be delivered to the cutting rolls in an even and uniform stream, so that it may be acted upon by the cutting rolls most effectively. If material reaches the cutting rolls in an uneven stream, large masses followed by a very thin stream, the large masses will not be cut through by the knives and the rolls will run comparatively empty during the passage of the thin stream and the efficiency of the rolls, and the whole system, is impaired.

Another important function of the picking drum is to detach the leaves from the stems of the forage, especially when alfalfa is being treated. I prefer to separate the leaves from the stems before the material reaches the cutting rolls and have provided means for such separation, as hereafter described. The action of the picking drum on the leaves usually reduces them sufficiently. Those not sufficiently reduced are returned to the cutting rolls from the screening mechanism. The picking and tearing apart of the material, dislodges foreign objects that may be entangled with the material and thus the separation of such matter from the material being treated is facilitated. Much of the foreign matter, such as metal objects, pieces of stone, etc., would injure the rolls if allowed to pass between them, hence the necessity of their removal at the beginning of the operation.

Another very important function of the picking drum is to dislodge the dust and mold mingled with, and adhering to, the material, so that it may be separated from and taken out of the material, thereby cleansing it. Such dust and mold are very deleterious to the health of animals when administered to them with their food, and the elimination thereof improves the quality of the material treated.

The matter to be separated and taken out and away is found suspended in the air. I therefore employ an exhaust fan 230, suitably located and driven, to remove it. The intake pipe 231 of the exhaust fan, is preferably extended into the casing of the granulating mechanism to the rear of the picking drum. The operation of the granulating mechanism dislodges any remaining dust or mold from the material as it is being treated, subsequent to the action on it of the picking drum. As the casing of the granulating mechanism forms a single chamber, the indicated location of the intake pipe of the exhaust fan enables it to draw the dust-laden air from all parts of the casing. The picking drum after acting upon the material, delivers it to a conveyer belt, which carries it to a set of rakes which act above a table or shelf, to which the material is delivered by the conveyer belt. These rakes feed the material to a picking drum, forcing it against the face of the drum so that the teeth of the drum can and will take hold of the material, similarly to the first named picking drum, and complete the final separation of the naturally clinging material and deliver it to the cutting rolls heretofore described, in an even and uniform stream. The said rolls have their knives arranged both longitudinally and circularly, whereby they are adapted to cut and break the stalks of the material, whether they enter the rolls occupying either the horizontal or vertical position. After passing through the cutting rolls, the material is carried upwardly through the instrumentality of conveyer belts, and delivered to any other suitable mechanism for further treating the material.

Having briefly outlined my improved construction I will proceed to describe the same in detail, reference being made to the accompanying drawing, in which is illustrated an embodiment thereof.

In this drawing: Figure 1 is a side elevation of the granulating mechanism or the cutting portion of my improved machine, looking in the direction of arrow 1, Fig. 3. Fig. 2 is a vertical longitudinal section of the same taken on the line 2—2, Fig. 3. Fig. 3 is a top plan view, partly in section, showing the general arrangement of the pulleys, with their communicating belts removed. This is a sectional view taken approximately on the line 3—3, Fig. 2, looking downwardly. Fig. 4 is an enlarged detail view showing the mechanism for feeding the forage to the machine and effecting its initial separation and distribution. This view shows the same mechanism as the upper left-hand portion of Fig. 2, but on a larger scale. Fig. 5 is a top plan view of the same. Fig. 6 is a detail view, showing one of the removable teeth of the initial picking or distributing drum. Fig. 7 is a detail view partly in section showing the bearings in which the cutter rolls are mounted, together with the tension-regulating means for one roll of each pair. Fig. 8 is a detail view showing compensating gears and bearings mounted on the opposite side of the machine from that shown in Fig. 7. Fig. 9 is a longitudinal section of one of the upper cutting rolls. Fig. 10 is a cross sectional view of the upper pair of coöperating cutting rolls shown in the assembled relation. The section of the left-hand roll is taken on the line 10, Fig. 9 and that of the right-hand is taken on the line 10ª of the same figure. Fig. 11 is a view of the lower pair of coöperating cutting rolls, the roll on the left being shown in end elevation and that on the right in central section. Fig. 12 is a detail view of one of the knives of the roll shown in Fig. 9. Fig. 13 is an elevation partly in section of one of the lower rolls, having circular cutting knives. Fig. 14 is an elevation in detail of one of the circular knives of the roll, shown in Fig. 13, shown detached from the roll. Fig. 15 is a similar view of one of the spacing rings employed for separating the circular knives. Fig. 16 is a fragmentary section taken through the two lower rolls or those having the circular knives, the latter being shown in operative relation. Fig. 17 is a similar view showing a slightly modified form of construction.

The same reference characters indicate the same parts in all the views.

Let the numeral 5 designate a conveyer located at the front part of the machine and inclosed by a housing 6. This conveyer consists of a series of endless chains 7, suitably separated and supported by a stationary bed 8 which engages the upper runs of all the chains. These chains are equipped with teeth 9 adapted to carry the material upward to a roll 10, having a series of toothed disks 12 arranged upon the roll at suitable intervals. These disks project somewhat above the teeth of the conveyer chains and carry the material to an adjacent picking or distributing drum 13, whose outer surface is equipped with teeth 14, suitably arranged thereon. This roll is mounted to travel at a much faster speed than the roll 10, and the teeth 14 thereon are arranged quite close to the teeth of the disks 12. The teeth of the latter disks are so arranged and shaped that the teeth of the more rapidly traveling drum 13 are compelled to grab the material and tear it, so to speak, from the disks, thus pulling it apart or separating it from its original clinging condition, and delivering it to an endless conveyer belt 15, which is arranged below the drum 13 and is mounted on two end drums 16 and 17, the drum 17 being located above the drum 16, whereby the conveyer belt is upwardly inclined from its forward extremity toward the rear. The drum 17 is located adjacent a shelf or table 18, suitably supported upon the frame work of the machine.

To separate and take out the objectionable foreign matter, and to divert the leaves from the cutting rolls, a gap 232 is provided between drum 17 and table 18, through which they fall, assisted by belt 15. The stems are carried over the gap by rakes 19. The leaves and the heavy foreign matter are mostly deposited at the bottom of the stream of material as it is thrown on the belt 15 by the action of drum 13, and are carried through the gap by said belt, falling upon inclined member 193. The low specific gravity of the leaves causes them to travel slowly over the inclined member 193, and to drop from it almost vertically. The higher specific gravity of the foreign matter, such as pieces of iron, stone, etc., gives them sufficient momentum to carry them out from member 193 in a wide curve. Adjustable plate 189ᴬ is adapted to be positioned so that its upper edge shall come between the stream of almost vertically falling leaves and the stream of outwardly curving foreign matter, thus separating the two streams. The leaves falling on plate 189ᴬ are guided by it to elevator belt 56, while the foreign matter passing over said plate is caught in a convenient receptacle from which it is removed as desired. Above the shelf 18, is a series of reciprocating rakes 19, whose forward extremities are alternately connected with the oppositely disposed cranks 20 of a crank shaft 21, which rotates during the operation of the machine. By virtue of this connection it is evident that any two adjacent rakes will move simultaneously in opposite directions, one moving forwardly while the other moves rearwardly, the movement of each reversing after a relatively short period of travel.

The rear extremity of each rake is pivotally connected as shown at 22, with the lower extremity of a link 23, whose upper extremity is pivotally connected with the frame work as shown at 24. The teeth of these rakes are so arranged that they project rearwardly, whereby they are adapted during their forward movement, to slip over the material on the shelf 18, and are adapted to carry the material rearwardly during the reverse movement. By virtue of the action of these rakes the material is separated and finally delivered to the picking drum 25. The rear end of table 18, forms a ledger plate coöperating with drum 25. Drum 25 is equipped with teeth of such length and number as to carry only the desired quantity of material past its coöperating ledger plate. As the teeth of drum 25 pass in close proximity to the ledger plate they can only carry past it a quantity proportional to their length, and its arrangement in such close proximity to the rear edge of the shelf, adapts it to further separate the stalks of material from one another and loosen them preparatory to delivering them to the upper pair of rolls. This construction contributes to the delivery of an even stream of material to the upper pair 26 of cutting rolls. The individual members of these rolls are designated 27, since they are substantially identical in construction. The body of each roll is cylindrical in shape, and as shown in the drawing (see Fig. 9), is formed hollow, its outer portion or shell 28 having its ends open and provided with heads 29. The outer surface of the body of each roll is equipped with a series of longitudinally disposed knives 30, arranged at suitable intervals in channels formed in the rolls therefor. These knives are secured in place at the ends of the drum by securing rings 31, whose inner surfaces are beveled to engage the correspondingly beveled extremities 32 of the knives. Beyond these securing rings, nuts 33 are threaded upon the drum and caused to engage the rings 31. The heads 29 of the drum are secured thereto by bolts 34 applied thereon inside of the drum, the outer faces of the heads being recessed as shown at 35, for the purpose. Through the center of each drum 27, is passed a shaft 36, having a pulley 37 at one extremity and a gear at the other extremity.

The two rolls 27 are rotated in such a manner that their upper portions are always traveling toward each other, whereby the material delivered thereto by the picking drum 25, is caused to pass between the two rolls where they are nearest each other, whereby the two sets of coöperating, intermediately disposed knives are caused to act thereon for the purpose of cutting and breaking the material, as far as possible. It is evident from the arrangement of these knives that their action will be most effective upon the stalks of material which pass thereto in a perpendicular direction. It is also evident that stalks which are delivered to these drums, extending lengthwise of the drums, may pass therethrough without being materially cut or reduced by the knives. Such stalks, however, will naturally fall to the lower pair 39 of the cutting rolls, occupying the same position. The knives, however, are so arranged upon these rolls which are individually designated as 38, that they will act to cut the stalks extending longitudinally on the rolls. The circular knives, with which the rolls 38 are equipped, are arranged at suitable intervals upon each roll, the rolls and knives being so positioned that the individual knives of one roll occupy an intermediate position with reference to the two adjacent knives of the opposite roll. These knives are also so arranged that their cutting edges cannot come in direct contact with the body of the opposite roll. This feature, both with reference to the longitudinally disposed knives, as well as to the circularly arranged knives is important, since it causes the knives to act more effectively upon the material, both for cutting and breaking purposes. It has been found by experience that if the cutting edges of the knives are allowed to come in direct contact with the outer faces of the body of the rolls, that their cutting and breaking action is not nearly so effective.

Each roll 38 is composed of a shell 40, whose extremities are threaded to receive threaded rings 41. Between these rings the circular knives 42 are located. Each knife is so constructed that its central opening 43 is large enough to receive the body of the drum, the latter being equipped with a key or spline 44, which enters a recess 45, formed in the inner edge of the knife, whereby the knives are locked against rotation upon the drum. These knives are spaced by rings 46, which are located intermediate the knives. These spacing rings 46 are provided with a number of inwardly projecting lugs 47, which engage the outer surface of the shell, thus raising the body of each spacing ring from the surface of the roll.

The body of each roll is formed hollow, (see Fig. 13) and its open ends are provided with heads 48, which are held in place by securing bolts 49, inserted from the inside, their heads being located in recesses 50 formed in the heads of the rolls for the purpose. Through the center of each roll 38 is passed a shaft 51, to which the body of the roll is made fast by means of keys or splines 52. To one extremity of the shaft 51 is secured an operating pulley 53.

Instead of using spacing rings in the construction of the rolls 38, the circularly arranged knives 42 may have their body portions formed relatively thicker, whereby their outer sharpened or beveled edges 54 form V-shaped spaces 55, which the corresponding cutting edges of the rings 42 of the opposite roll are adapted to enter, the V-shaped spaces 55 of either roll being relatively deep, whereby the cutting edge of any knife opposite such space, passes within the said space. This construction and arrangement of the circular knives is illustrated in Fig. 17. After the material has passed through the rolls 38 as just explained, it is delivered to an endless belt 56, whose lower portion engages a drum 57, the said belt also passing over an idle roller 59. The belt 56 travels in the direction of the arrow in Fig. 2, and engages another endless belt 62 which passes around a drum 63. The inner surface of the belt 62 is engaged by a tension device 66 which is composed of end arms 67 pivotally connected with a housing 61 through which both of the belts 56 and 62 pass, the pivotal connection being shown at 68. The outer extremities of these arms are connected by a spindle 69, upon which is mounted a roller 70, the arms 67 being normally so inclined that the weight of the roller 70 is supported by the outer run of the belt 62, the said roller engaging the inner surface of the belt and pressing the latter against the outer surface of the belt 56, the latter giving motion to the belt 62, and the friction between the two belts being sufficient to carry the material upwardly from the granulating mechanism to any suitable or desired place, as heretofore explained. The belt 56 is held in operative relation with the belt 62 for the aforesaid purposes, by a roller 71 supported in the housing 61, the latter being provided on opposite sides with relatively narrow strips or cleats 72, whose inner surfaces are beveled as shown at 73, and which engage the outer edges of the belt which are slightly bent inwardly as shown at 74, whereby a comparatively tight joint is formed to prevent the material from working past the edges of the belt or the sides of the housing.

It is obvious that belts 62 and 66 are suitably supported at their upper extremities by drums similar to drums 57 and 63, and for the purposes of this invention need not be described here in detail or illustrated.

Power is originally communicated to the granulating mechanism by a belt 158, leading from a motor or line shaft, not shown, and connected with a pulley 159, fast upon one extremity of the shaft 51 of one of the cutter rolls 38. Upon the opposite extremity of this shaft 51 is a pulley 53 of the said cutter roll. This pulley 53 is engaged by a belt 160 which also engages the pulley 53 of the coöperating roll 38, both pulleys 37 of the upper pair of cutting rolls 27, a pulley 161 upon one extremity of the shaft 162 of the picking drum 25 and also a pulley 163 fast upon the shaft 164, which is also provided with a pulley 165, from which leads a belt 166 to a pulley 167, fast on a shaft 168 of the picking drum 13. There is also a pulley 169 upon the shaft 168, and adjacent to the pulley 167, from which leads a belt 170 to a pulley 171 upon the crank shaft 21. There is also a gear 172 fast on the crank shaft 21 and meshing with a gear 173, fast upon the shaft 174 of the drum 17.

The shaft 168, as shown in the drawing, extends entirely through the casing of the granulating mechanism and upon each extremity thereof, outside of the casing, is located a friction pulley 175. These friction pulleys, which are relatively small, engage other larger pulleys 176, fast upon a shaft 177 of the roller 10. It will thus be understood that the speed of the roller 10 is much less than that of the picking drum 13, as heretofore explained.

The foregoing description sets forth somewhat in detail the means whereby motion is communicated to various elements of the mechanism.

The roller 57 which is engaged by the belt 56, is journaled in boxes 178 slidably mounted in upper and lower supports 179 and 180, located outside of the casing of the granulating mechanism, the walls of the casing being provided with slots 181 through which the shaft 182 of the roller passes. The journal boxes 178 are each connected with a link 183 to one extremity of which is attached a cable 184, which engages the periphery of a pulley 185, the cable or belt being secured to the pulley, as shown at 186. There is a pulley 185 on each side of the machine, both pulleys being made fast to the same shaft 187, which passes transversely through the casing. To one extremity of this shaft is secured an arm 188, provided with an adjustable weight 189, which is of sufficient mass to give the belt 56 the required tension.

Mounted above the roller 57, and located within the casing, inclosing the granulating mechanism, is an upwardly projecting plate 189$^A$, hinged or pivoted at its lower extremity as shown at 190. This plate is adjustable by means of a bolt 191 threaded in a stationary bar 192 located within the said casing. An important function of the tension device composed of roller 57 and the parts numbered 179 to 189 inclusive is to permit elevator belt 56 to accommodate itself to the variable stream of material carried by it around drums 63 and 75. The function of this plate 189$^A$ is to separate any material which falls downwardly from the rear extremity of the conveyer belt 15 in passing to the shelf 18. The heavy, foreign, worthless material strikes upon an inclined member 193, projecting downwardly from the shelf 18, and this material is supposed to pass over and to the left of the adjustable plate 189$^A$, while the leaves fall upon the plate 189$^A$, which guides them to elevator belt 56, and the position of the last named plate is regulated to this end, thus separating the worthless foreign material from the valuable material, mostly leaves, as heretofore described.

One of the shafts 36 carrying the cutting roll 27, is journaled in boxes 194, mounted upon frame columns 195 of the machine. These boxes are pivotally connected with the columns 195, as shown at 196, whereby the roll is allowed a limited degree of movement to prevent breakage in case a hard, foreign substance should reach the rolls 27. In order to give the movable roll 27 the desired tension, the boxes 194 are each connected by means of a link 197, with an arm 198 of a bell crank lever 199, fulcrumed at 200. Upon one side of the machine, the other arm 201 of this lever is equipped with an extension arm 202, upon which is mounted an adjustable weight 203. This weight is of suitable mass to cause the movable roll 27 to be forced toward its coöperating roll with sufficient power for the purpose required.

In order to limit the movement of the movable roll in its travel toward its coöperating roll, a stop bolt 204 is employed, the said bolt being connected with the frame column 195. One of the shafts 51 upon which the cutting roll 38 is mounted, is journaled in similar movable boxes 205, pivotally connected with the frame column as shown at 206. Each box is connected with a link 207, which also leads to the arm 208 of a bell crank lever 209, fulcrumed at 210, and having an extension arm 212 equipped with an adjustable weight 213. This mechanism performs the same function in connection with the cutter roll 38 that the previously described mechanism performs in connection with the upper roll 27.

In order that the two cutter rolls 27 may at all times occupy such relation to each other that their longitudinally disposed knives shall properly intermesh, the shafts 36 are provided with gears 214 and 215 respectively. The gear 215 is fast on the shaft journaled in stationary boxes 216, while the gear 214 is fast on the shaft journaled in the movable boxes 194. The gear 215 meshes with a gear 217 fast on a stub shaft fastened to the frame work. This shaft 218 is connected by means of a pair of links 219, with a pin 220 upon which a gear 221 is mounted. This gear may be termed a float gear, since the links 219 simply connect this gear with the shaft 218 of the gear 217. Another pair of links 222 connect the pivot pin 220 with the shaft 36 upon which the gear 214 is mounted. The gears 214, 215, 217 and 221 are all of the same size and the float gear 221 permits the movement of the movable cutter roll 27, while the aforesaid chain of gears maintains the two rolls 27 in the proper relative position at all times, regardless of the movement permitted by the one roll, as heretofore explained. The shaft 177 is journaled in boxes 222<sup>A</sup>, slidably mounted in housings 223, mounted on opposite sides of the casing of the granulating mechanism. Located in each housing, is a coil spring 224, one extremity of which presses against the box 222<sup>A</sup>, while the other extremity engages a stop 225, mounted upon the inner extremity of a tension screw 226. By virtue of this construction, the roll 10 carrying the toothed disks, is movably mounted and held under sufficient tension for proper coöperation with the picking drum 13, as heretofore explained.

A pair of arms 222<sup>B</sup> depending from shaft 222<sup>C</sup> mounted above boxes 222<sup>A</sup>, the lower ends of said arms 222<sup>B</sup> being attached to boxes 222<sup>A</sup> causes both of those boxes to move simultaneously, so that roll 10 is always held parallel with drum 13. As roll 10 is driven by friction by drum 13, it is obvious that if they are but slightly separated, roll 10 will stop. If so large a quantity of material is delivered by roll 10 to drum 13 that teeth 14 will not extend through the mass, it will tend to crowd through between the roll and drum, thus forcing them apart and, at the same time break the contact of friction wheels 175 and 176<sup>M</sup> thereby causing roll 10 to stop until drum 13 shall have carried enough of the material through to relieve the pressure and allow the pulleys 175 and 176 to come into contact again. This automatic action of roll 10 contributes to an even and uniform delivery of material to the cutting rolls. When roll 10 stops drum 13 cannot carry through more material than teeth 14 can lay hold of, as said teeth are positioned to travel in close proximity to the points of the teeth of disks 12 of roll 10 so that they can carry through only what they can lay hold of.

The lateral movement of roll 10 is so slight that the coöperative relationship of roll and drum are not appreciably affected. The length of teeth 14 is proportioned to the amount of material they are designed to deliver to belt 15.

The amount of material that is to pass through the mechanism can be regulated by the length of teeth 14. The reciprocating bars 125, which operate the beater mechanism are each provided with two separated stops 227, on opposite sides of a stationary stop 228, provided with an opening through which the rod passes. Interposed between the stationary stop 228 and each of the end stops 227, mounted upon the rod, is a spiral spring 229. It will be understood from the description heretofore given of this mechanism, that when the bar moves in one direction, one spring 229 is placed under tension, while when it moves in the opposite direction the other corresponding spring is placed under tension, the two springs having a tendency to return the bar to its normal position, or that corresponding with the vertical arrangement of the crank arms 124, connected with the beater rock shafts 121, as heretofore described.

From the foregoing description, the use and operation of my improved machine will be readily understood.

The material to be treated is first delivered to the conveyer 5, and carried thereby to the roll 10 carrying the toothed disks 12, whence it passes to the picking drum 13, traveling more rapidly than the roll 10, as heretofore described. This picking drum separates the material and delivers it to the belt conveyer 15, whence it passes to the shelf 18, where it is acted upon by the reciprocating rakes 19, which deliver it to the picking drum 25, which, after the performance of its function, discharges the material to the upper pair of cutting rolls, which are individually designated 27. From the rolls 27, the material is passed to the lower pair of rolls 38, these two pairs of rolls, having their knives disposed in different positions, one set of knives being longitudinally arranged, and the other set circularly arranged, upon their rolls, are adapted to granulate the material, as heretofore described. The material after passing through the two pairs of rolls, is delivered to the belt 56, which coöperating with the belt 62, carries the material upwardly and discharges it to any suitable mechanism for further conveying the material to a suitable place of storage as may be desired.

Material which has not been granulated to sufficient fineness may be returned to the cutting rolls for retreatment through a discharge chute 103.

Having thus described my invention, what I claim is:

1. A granulating machine, including a shelf having a downwardly inclined plate at its forward extremity for separating the heavier material from the leaves and lighter material, means separated from the shelf for conveying material thereto, a picker drum arranged in the rear of the shelf, a rake arranged to reciprocate on the said shelf for feeding material to the picker drum, substantially as described.

2. A granulating machine including a shelf having a forwardly located downwardly inclined plate for separating the heavier foreign material from the leaves and lighter material, means separated from the said shelf for conveying material thereto, and a rake reciprocably mounted above the shelf for the purpose set forth.

3. A granulating machine including an endless traveling conveyer, a set of reciprocating rakes arranged at the end of the endless traveling conveyer, a shelf arranged below the rakes and also at the end of the endless traveling conveyer, the said shelf being arranged to receive the material from the conveyer, and a coöperating picking drum arranged in the rear of the shelf and to which the material is delivered by the rakes from the said shelf, substantially as described.

4. A granulating machine including an endless traveling belt, a roll arranged at the forward extremity of the said belt and provided with teeth arranged to retard the travel of the material, a coöperating picking drum, a shelf positioned at the rear end of the said belt and arranged to receive the material from the said belt, a set of reciprocating rakes arranged above the shelf, and a second picking drum in the rear of the shelf, for the purpose set forth.

5. A granulating machine comprising a conveyer, means for retarding the material, and a picker drum coöperating with the said means arranged at the forward end of the conveyer, a set of reciprocating rakes arranged at the rear end of the conveyer, a shelf arranged below the rakes and also at the rear end of the conveyer, the said shelf being arranged to receive the material from the conveyer, and a picking drum arranged in the rear of the shelf and to which the material is delivered by the rakes from the said shelf, substantially as described.

6. A granulating machine, including an endless traveling conveyer, a roll arranged at the forward extremity of the conveyer and provided with means for retarding the travel of the material, a coöperating picker drum, a shelf positioned at the rear end of the said conveyer and arranged to receive the material from the said conveyer, a second picker drum in the rear of the shelf, and means for conveying the material from the shelf to the second picker drum, substantially as described.

7. A granulating machine including an endless traveling conveyer, means arranged at the forward extremity of the conveyer for retarding the travel of the material, a picking drum coöperating with the said means, a shelf positioned at the rear end of the conveyer and arranged to receive the material from the said conveyer, a second picking drum in the rear of the shelf for conveying the material from the shelf to the second picking drum, substantially as described.

8. A granulating machine including a conveyer, a roller arranged at the forward extremity of the conveyer and provided with means for retarding the travel of the material, a coöperating picker drum, a second picker drum arranged at the rear end of the conveyer and separated therefrom for further treating the material, and rakes arranged between the rear end of the conveyer and the second picker drum for conveying the material to the second picker drum.

9. A granulating machine including an endless traveling conveyer, means arranged at the forward extremity of the conveyer for retarding the travel of the material, a picker drum coöperating with the said means, and a second picker drum arranged at the rear of the endless traveling conveyer, and means interposed between the second named picker drum and the conveyer for conveying the material to the said second picker drum, substantially as described.

In testimony whereof I affix my signature in presence of two witnesses.

WILLIAM L. MONROE.

Witnesses:
 A. J. O'BRIEN,
 JESSIE F. HOBART.